United States Patent [19]

Ericson

[11] Patent Number: 5,553,836

[45] Date of Patent: Sep. 10, 1996

[54] ADJUSTABLE SUSPENSION SYSTEM

[75] Inventor: W. Keith Ericson, Nashville, Tenn.

[73] Assignee: Patentials Incorporated, Nashville, Tenn.

[21] Appl. No.: 439,158

[22] Filed: May 11, 1995

[51] Int. Cl.$^6$ .................................................. B60G 1/00
[52] U.S. Cl. ............................ 267/286; 267/177; 267/221
[58] Field of Search .................................. 267/177, 170, 267/179, 219, 221, 286, 291, 224; 280/701, 724, 696, 707

[56] References Cited

U.S. PATENT DOCUMENTS

| | | |
|---|---|---|
| 986,921 | 3/1911 | Jackson .................................. 267/177 |
| 2,625,388 | 1/1953 | Herreshoff et al. . |
| 2,661,206 | 12/1953 | Gregoire . |
| 2,697,600 | 12/1954 | Gregoire . |
| 2,801,112 | 7/1957 | Piper .................................... 267/177 X |
| 2,801,113 | 7/1957 | Piper .................................... 267/177 X |
| 3,010,714 | 11/1961 | Stresnak . |
| 3,033,590 | 5/1962 | Statler . |
| 3,559,976 | 2/1971 | Jerz, Jr. . |
| 3,830,482 | 8/1974 | Norris . |
| 4,223,912 | 9/1980 | Reyes . |
| 4,532,462 | 7/1985 | Washbourn . |
| 4,744,444 | 5/1988 | Gillingham . |
| 4,830,395 | 5/1989 | Foley . |
| 5,024,111 | 6/1991 | Harvey . |
| 5,044,614 | 9/1991 | Rau . |
| 5,116,016 | 5/1992 | Nagata . |
| 5,306,031 | 4/1994 | Quinn et al. . |

Primary Examiner—Douglas C. Butler
Attorney, Agent, or Firm—Rick R. Wascher

[57] ABSTRACT

An adjustable suspension system including a substantially cylindrical post having an externally threaded surface. The threads cooperate with a thread pattern associated with an adjustment collar. A spring is interpositioned between the adjustment collar and the axle of the vehicle such that when the adjustment collar or post is turned about the cooperating thread pattern therebetween the spring has a tendency to compress or decompress depending upon the direction of rotation of the collar, and therefore raise or lower the body of a vehicle.

9 Claims, 3 Drawing Sheets

ADJUSTABLE SUSPENSION SYSTEM

BACKGROUND OF THE INVENTION

1. Field of the Invention

The present invention relates generally to suspension systems for motorized vehicles, but more particularly to such suspension systems used to level the vehicle when transporting a heavy load.

2. Description of the Related Art

The art to which the invention relates includes motorized vehicle suspension systems and such systems used to level the body of a motorized vehicle when the vehicle transports or carries a heavy load.

The suspension systems comprising the art to which the invention relates are most commonly found in motorized vehicles such as pickup trucks and vans used to haul cargo, but may also be included in light or heavy duty trucks and automobiles. One such suspension system is the pneumatic shock absorber.

An advantage of a pneumatic shock absorber is the ability to control the body height of the vehicle, such as the bed height of a pickup truck, through the introduction of a pressurized gas such as air into the shock absorber which is interpositioned between the frame and the body of the vehicle. When pressurized, the length of the pneumatic shock increases and is able to adjust the relative parallel relationship of the vehicle's bed (or body) with the ground surface on which it rests.

For example, when a user of a pneumatic shock absorber applies a heavy load to the cargo carrying area of the vehicle, the vehicle body typically sinks onto the frame due to the weight of the load and the compression of the existing springs and shocks. The user simply injects a quantity of pressurized air to increase the length of the pneumatic shock and enable the vehicle body to be raised thereby overcoming the downward force associated with the load. In this manner, the vehicle may be leveled despite the load it carries.

Other such suspension systems incorporate a combination of shock absorbers and springs. For example, some light or heavy duty trucks incorporate a coil spring which surrounds the shock absorber. The coil spring adds the additional resistance to the displacement of the body when it is subject to heavy loads. Leaf springs are commonly associated with passenger vehicles and light duty trucks. A leaf spring is typically a series of stacked strips of long flexible metal. One end of the spring is attached to the body and the other is in some way attached to or in contact with the axle of the vehicle. The leaf spring applies an upward force on the body of the vehicle to compensate for applied loads in the passenger or cargo compartments.

Until now, however, a mechanical or electro-mechanical device suitable for leveling a motorized vehicle when it is subject to carrying a heavy load simply by rotating an adjustment collar has not been invented.

SUMMARY OF THE INVENTION

The preferred embodiment of the present invention incorporates a substantially cylindrical post having an external surface with a continuous thread pattern. The threads of the external surface of the post are configured to cooperate with the threads of an adjustment collar or disc. The collar disc is provided to raise and lower the substantially cylindrical post. Of course, in the alternate embodiments, the collar may remain stationary, as described below, and allow the substantially cylindrical post to turn. In the preferred embodiment, the present invention is typically positioned between the frame superstructure and the axle of the vehicle in much the same manner as a conventional shock absorber.

The preferred embodiment of the present invention also incorporates a coil spring having spaced apart ends. One of the spaced apart ends rests on a platform typically associated with the axle or drive train area of the frame in much the same manner as the conventional coil spring found in light or heavy duty trucks. The other free end of the coil spring underlies the adjustment disc.

Thus, when the adjustment collar is raised or lowered by turning it on the cooperating threads with the post, the coil spring would have a tendency to compress or expand depending upon the direction of adjustment. Similarly, when the cylindrical post is turned the collar may remain stationary and thus provide a substantially similar effect.

In this manner, a downward force applied to the body could be counteracted by turning the collar or the cylindrical post in a direction having a tendency to compress the spring. Assuming the spring force is greater than the downward force associated with the load, the vehicle body will rise in response to the attempted compression of the spring, which is preferably sufficient to overcome the downward force associated with the load that is transmitted to the body.

An optional adjustment knob may be provided to more easily adjust the relationship between the adjustment disc and the body. The adjustment knob may be mechanically operated or driven by an electric motor of any suitable configuration. For example, and not by way of limitation, one such configuration may be a geared shaft terminating in an adjustment knob. The geared shaft interacts with a geared disk associated with either the cylindrical post or the collar. Turning the adjustment knob, mechanically or with the assistance of an electric motor, which is held in a rigid position but allowed to rotate, also turns the geared shaft which acts on the geared disc of the collar or cylindrical post. In the fashion, compression or decompression of the spring can occur. For example, if the adjustment knob is turned in a counterclockwise or clockwise direction, the adjustment disc or post turns causing the spring to compress and raise the vehicle body or decompress and lower the vehicle body depending upon the orientation of the invention.

Another embodiment of the invention may include a bearing assembly interpositioned between a collar jacket and the collar. The spring component is attached to the collar jacket which is allowed to rotate with respect to the collar by virtue of the bearing assembly. The bearing assembly may partially comprise a pair of spaced apart bearing plates and a plurality of bearings interpositioned therebetween.

The present invention can be summarized in a variety of ways, one of which is the following: an adjustable vehicle suspension system to level the body of a motorized vehicle, comprising: a post having an externally threaded surface; a collar having threaded interior surface configured to cooperate with the threaded surface of the post, and a spring interpositioned between the collar and the chassis of a motorized vehicle.

The suspension system may further include an attachment mechanism for rotatably attaching the post to the body of a vehicle, an attachment mechanism for rigidly attaching the post to the body of a motorized vehicle and enabling the collar to rotate with respect to the post, a bracket system for attaching the spring to the collar and the motorized vehicle, a geared adjustment mechanism provided initiate the compression and decompression of the spring.

The geared adjustment mechanism may include a geared shaft attached to an adjustment knob or electric motor, and an and a geared track associated with the post, or a geared shaft attached to an adjustment knob or electric motor and a geared track associated with the collar.

The present invention may also be summarized as follows: an adjustable vehicle suspension system to level the body of a motorized vehicle, comprising: a post and a collar rotatably attached to the post by a cooperating thread pattern; a spring interpositioned between the collar and the axle of a motorized vehicle; wherein rotation of the collar enables the spring to compress or decompress changing the elevation of the body of the motorized vehicle.

The invention may also include an attachment mechanism for rigidly attaching the post to the body of a motorized vehicle and enabling the collar to rotate with respect to the post, a bracket system for attaching the spring to the collar and the motorized vehicle, and a geared adjustment mechanism provided to initiate rotation of the collar to enable the spring to be compressed and decompressed in response to the rotation and change in position of the collar. The preferred embodiments that allow the spring to rotate would also require a rotation spring bearing surface to prevent degradation of the spring as it rotates against the collar or axle.

Yet another way of summarizing the invention is as follows: an adjustable vehicle suspension system to level the body of a motorized vehicle, comprising: a post having a threaded exterior surface; a collar having an interior threaded surface configured to cooperate with the threaded surface of the post, wherein the collar is constrained in a substantially fixed position and the post is allowed to rotate with respect to the collar; and a spring interpositioned between the collar and the axle of a motorized vehicle; wherein rotation of the post enables the collar to compress or decompress the spring to change the elevation of the body of the motorized vehicle.

The suspension system may further include an attachment mechanism for rotatably attaching the post to the body of a motorized vehicle and enabling the post to rotate with respect to the collar, a bracket system for attaching the spring to the collar and the axle, and a geared adjustment mechanism attached to the electric motor provided to initiate rotation of the post to enable the spring to be compressed and decompressed in response to the rotation and change in position of the post.

It is an object of the present invention to provide an adjustable suspension system for motorized vehicles.

It is an object of the present invention to provide an adjustable suspension system capable of leveling the body of a motorized vehicle.

It is an object of the present invention to provide an adjustable suspension system capable of manual or automatic adjustment to raise or lower the body of the vehicle.

It is an object of the present invention to provide a mechanical device to transmit an applied spring force to the body of a vehicle.

It is an object of the present invention to provide an adjustable suspension system capable of manual manipulations such that the level of a vehicle body may be adjusted.

DETAILED DESCRIPTION OF THE PREFERRED EMBODIMENT(S)

Figure 1:
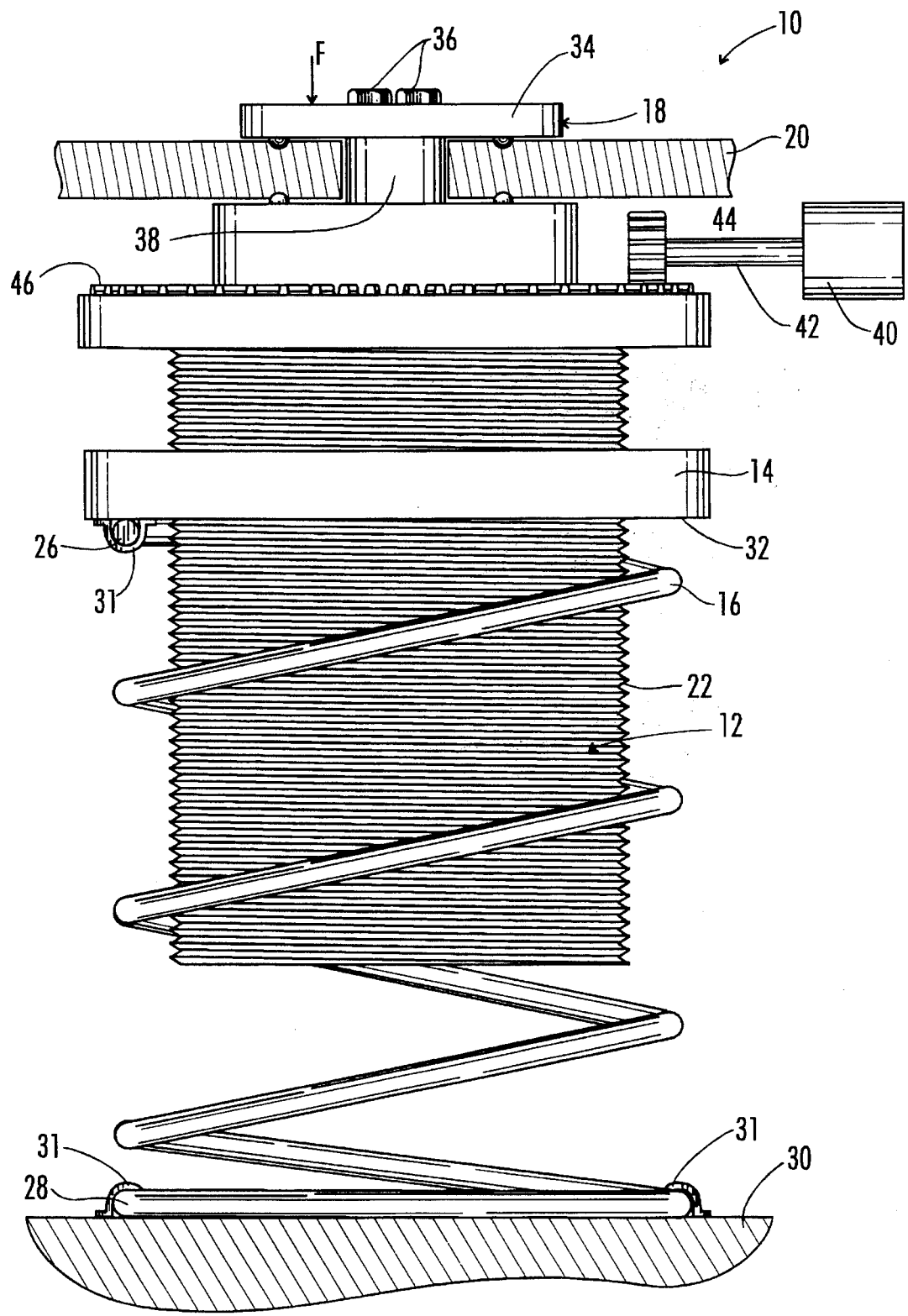
FIG. 1 is a perspective view of an embodiment of the present invention.
Figure 2:
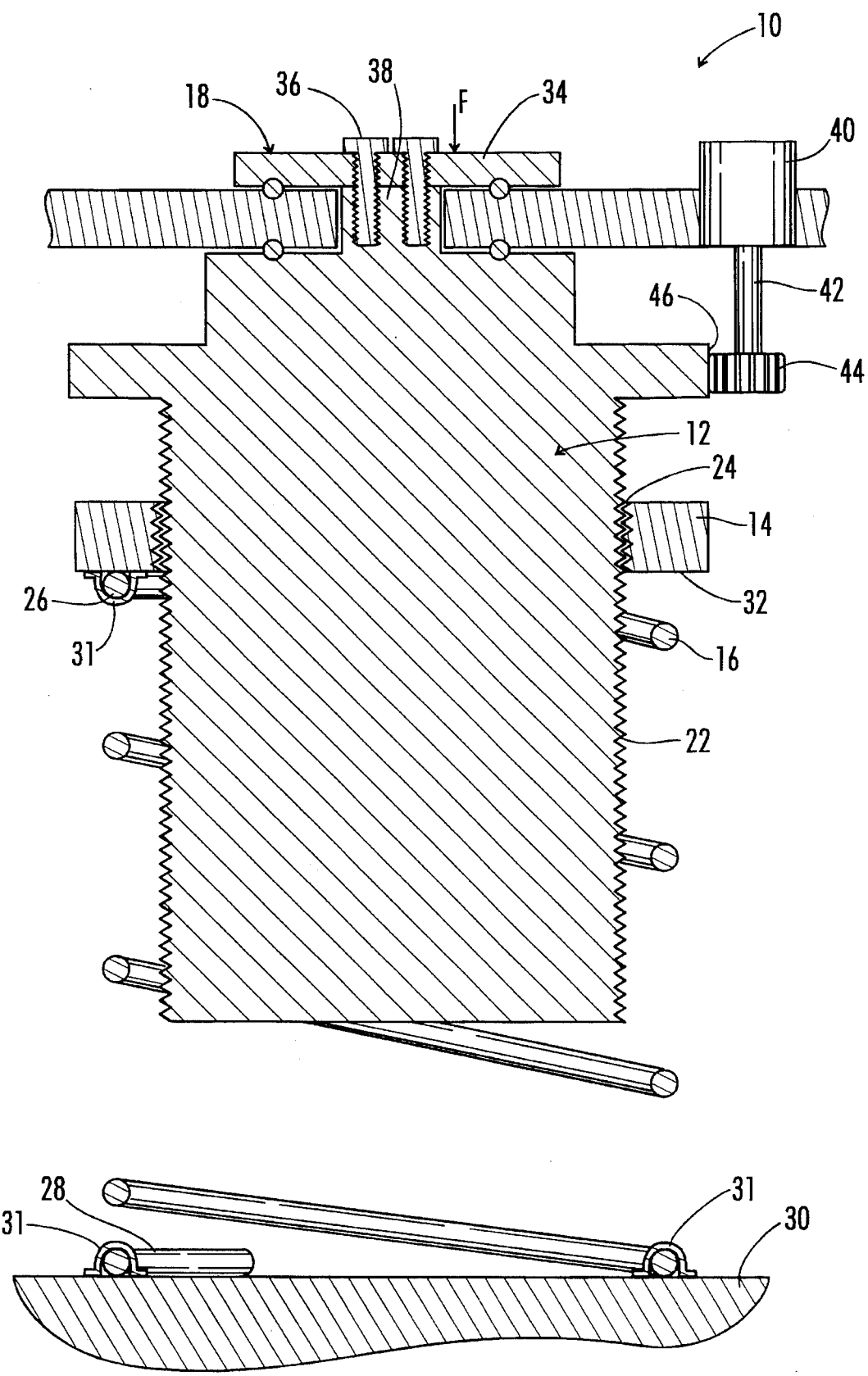
FIG. 2 is a cross sectional view of the embodiment shown in FIG. 1.
Figure 3:
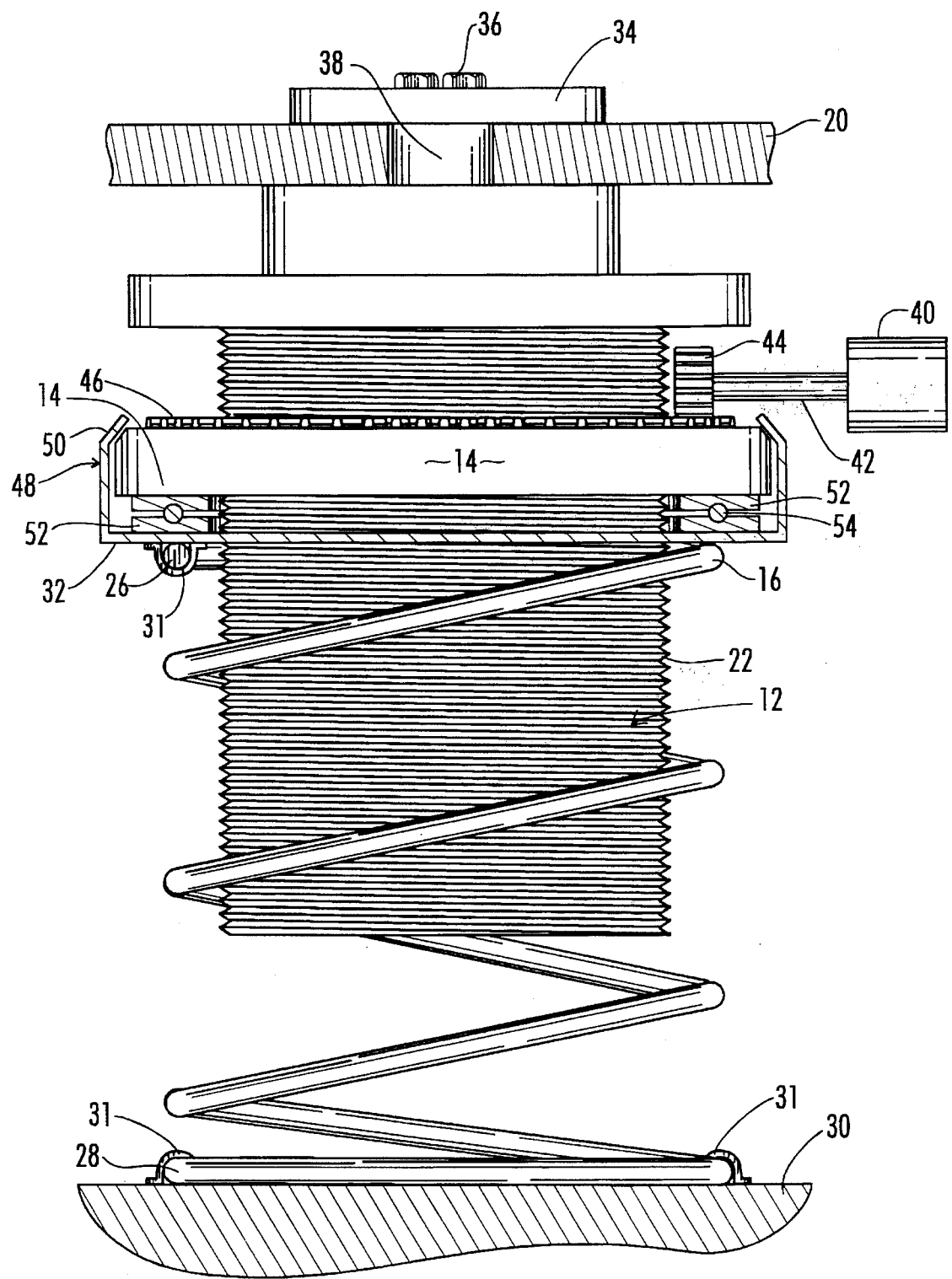
FIG. 3 is a perspective view of an alternate embodiment of the invention.

With reference to FIGS. 1–3, an embodiment of the present invention is designated generally by the reference numeral 10. Embodiment 10 is comprised of a substantially cylindrical post 12, an adjustment collar 14, a spring 16, and an attachment mechanism 18 capable of attaching the substantially cylindrical post 12 to the body 20 of a motorized vehicle.

In use, the substantially cylindrical post 12 having a cooperating thread pattern 22 configured to enable the adjustment collar 14, also having a similar thread pattern 24 (FIG. 2), may be turned to compress and decompress the spring 16 to raise and lower the vehicle body 20.

Thus, the coil spring 16 has spaced apart ends 26 and 28. End 26 is positioned adjacent to and abuts the adjustment collar 14. Opposite end 28 abuts and is adjacent to a component of a motorized vehicle such as the axle 30. The spring ends 26 and 28 are held in relative alignment with the collar 14 or axle 30 by any suitable means of attachment such as clamps 31. When the adjustment collar 14, or the post 12 is turned, for example in a clockwise direction, the adjustment collar would move in a downward direction toward the axle 30 or the post 12 may move in a counter-clockwise direction. In so doing, the adjustment collar 14 compresses the spring 16 which in turn applies an upward force on the bottom surface 32 of the collar 14. In this manner, when a downward force F is applied to the attachment mechanism 18, or directly to the substantially cylindrical post 12 by virtue of its connection to the body 20 of the motorized vehicle, the upward force of the spring applied to the bottom surface 32 of the collar 14 is sufficient to overcome the downward force F by virtue of the cooperation and force transfer between the threads 22 and 24. So long as the spring force associated with the spring 16 is sufficient to overcome the force F, the body may be leveled or raised.

Similarly, if the force F is removed, the adjustment collar 14 or post 12 may be turned in a reverse direction enabling the collar 14 to move upward and the substantially cylindrical post 12 to rotate, thereby enabling the vehicle body 20 to be leveled.

In one embodiment, the attachment mechanism 18 comprises a clamping plate 34 which receives at least one fastener 36 which is capable of engaging a connection knob 38 associated with the post 12. In this manner, the body 20 of the motorized vehicle may be clamped between plate 34 and the post 12 and establish a rigid communication therebetween. In another embodiment, the attachment mechanism and post 12 may rotate with respect to the body 20 enabling the collar 14 to remain still.

Alternatively, if the collar 14 is allowed to rotate and the post 12 is held stationary, turning the collar 14 may be cause the substantially cylindrical post 12 to be elevated or lowered and would enable the body 20 to be raised or lowered in response thereto.

The preferred embodiments also include an adjustment knob or electric motor 40 which may be mechanically or electro-mechanically driven. Thus, knob or motor 40 is attached to a shaft 42 which is in turn attached to a gear 44. The teeth of the gear 44 mesh with the geared disc 46 of the cylindrical post or collar 14. When the preferred embodiments of the present invention are attached and interpositioned between the frame and body of a motorized vehicle, the user may simply turn the adjustment knob or actuate the electric motor 40 to adjust the body height and therefore leveling the vehicle in a manner described above when an applied load F corresponding to a downward force is applied to the body 20.

Yet another embodiment of the present invention may include a bearing assembly designated generally by the reference numeral 48. Assembly 48 further comprises a collar jacket 50, bearing plates 52 and bearings 54. In this embodiment, spring 16 is attached to the collar jacket 50 by brackets 31 to enable the collar jacket 50 to rotate with respect to the collar 14 and body 12.

As shown in FIG. 3, jacket 50 is attached to collar 14 by a cooperating pair of beveled surfaces, one of which is formed in the jacket 50 and the other is formed on the collar 14. The mating relationship of the cooperating beveled surfaces insures that an upward or downward movement of the collar 14 induces a corresponding upward and downward movement of the jacket 50 by virtue of an abutting contact between the cooperating beveled surfaces of the collar 14 and jacket 50.

These and other embodiments of the present invention shall become apparent after consideration of the specification and drawings included herewith and all such alternate embodiments and equivalents are believed to be part of the present invention whose only limitation is the scope of the appended claims.

What is claimed is:

1. An adjustable vehicle suspension system to level a body of a motorized vehicle, comprising:

a post having an externally threaded surface;

a collar having a threaded interior surface configured to cooperate with the threaded surface of the post;

a spring interpositioned between the collar and an axle of the motorized vehicle;

a geared adjustment mechanism provided to initiate the compression and decompression of the spring; and a beating assembly including a collar jacket rotatably and permanently attached to the collar, spaced apart bearing plates, a bearing component interpositioned between the bearing plates, and cooperating beveled surfaces associated with the collar and the collar jacket to ensure the collar jacket and collar remain attached to one another and move in unison along the post in response to rotations of the collar.

2. The suspension system of claim 1, further including:

an attachment mechanism for rotatably attaching the post to the body of a vehicle.

3. The suspension system of claim 1, further including:

an attachment mechanism for rigidly attaching the post to the body of a motorized vehicle and enabling the collar to rotate with respect to the post.

4. The suspension system of claim 1, further including:

a bracket system for attaching the spring to the collar and the axle.

5. The suspension system of claim 1, further including:

a geared shaft attached to adjustment shaft and a geared track associated with the collar.

6. An adjustable vehicle suspension system to level a body of a motorized vehicle, comprising:

a post;

collar means rotatably attached to the post by a cooperating thread pattern for adjusting the elevation of the body of the motorized vehicle;

a spring interpositioned between the collar means and an axle of the motorized vehicle;

collar means includes a collar jacket, collar, and a bearing assembly;

the bearing assembly further comprise spaced apart beating plates, a bearing component interpositioned between the bearing plates, and cooperating beveled surfaces associated with the collar and the collar jacket to ensure the collar jacket and collar remain permanently attached to one another and move in unison along the post in response to rotations of the collar; and an adjustment mechanism provided to initiate rotation of the collar to enable the spring to be compressed and decompressed in response to the rotation and change in position of the collar means and wherein rotation of at least a portion of the collar means enables the spring to compress or decompress and change the elevation of the body of the motorized vehicle.

7. The suspension system of claim 6, further including:

an attachment mechanism for rigidly attaching the post to the body of a motorized vehicle and enabling the collar means to rotate with respect to the post.

8. The suspension system of claim 6, further including:

a bracket system for attaching the spring to the collar means and the axle of the vehicle.

9. The suspension system of claim 6, further including:

a geared shaft attached to an adjustment shaft and a geared track associated with the collar.

\* \* \* \* \*